(12) United States Patent
Hirooka

(10) Patent No.: US 8,360,739 B2
(45) Date of Patent: Jan. 29, 2013

(54) CONTROL APPARATUS AND CONTROL METHOD FOR NEGATIVE PRESSURE GENERATING APPARATUS

(75) Inventor: Shigemasa Hirooka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 419 days.

(21) Appl. No.: 12/308,703

(22) PCT Filed: Apr. 24, 2008

(86) PCT No.: PCT/IB2008/001013
§ 371 (c)(1),
(2), (4) Date: Dec. 22, 2008

(87) PCT Pub. No.: WO2008/132582
PCT Pub. Date: Nov. 6, 2008

(65) Prior Publication Data
US 2010/0047081 A1    Feb. 25, 2010

(30) Foreign Application Priority Data
Apr. 25, 2007  (JP) ................. 2007-116259

(51) Int. Cl.
*F04B 43/12* (2006.01)
*F04B 49/06* (2006.01)
*F04F 5/48* (2006.01)
*B60T 8/44* (2006.01)
*B60T 13/46* (2006.01)

(52) U.S. Cl. .......... 417/53; 417/187; 303/114.3; 303/12
(58) Field of Classification Search ............ 417/54, 417/187, 53; 303/114.3, 12
See application file for complete search history.

(56) References Cited

U.S. PATENT DOCUMENTS

| | | | |
|---|---|---|---|
| 2005/0077373 A1 | 4/2005 | Ikeda | |
| 2006/0060175 A1* | 3/2006 | Sonoda et al. | 123/586 |
| 2007/0236083 A1* | 10/2007 | Kawamori et al. | 303/114.3 |

FOREIGN PATENT DOCUMENTS

| | | |
|---|---|---|
| DE | 10 2004 061 845 A1 | 7/2005 |
| GB | 2 416 580 A | 2/2006 |
| JP | A-2-40068 | 2/1990 |
| JP | A-2005-69175 | 3/2005 |
| JP | A-2005-297654 | 10/2005 |
| JP | A-2006-118385 | 5/2006 |
| JP | A-2006-131003 | 5/2006 |

* cited by examiner

Primary Examiner — Anh Mai
Assistant Examiner — Zachary J Snyder
(74) Attorney, Agent, or Firm — Oliff & Berridge, PLC

(57) ABSTRACT

A control apparatus for a negative pressure generating apparatus that includes an ejector that generates a negative pressure whose magnitude is larger than that of a negative pressure to be taken from an intake passage in an intake system for an internal combustion engine provided in a vehicle; and state change means for making the ejector function or stop functioning. The control apparatus includes prohibition control means for prohibiting the state change means from making the ejector function, according to a temperature of intake air.

9 Claims, 4 Drawing Sheets

CONTROL APPARATUS AND CONTROL METHOD FOR NEGATIVE PRESSURE GENERATING APPARATUS

BACKGROUND OF THE INVENTION

1. Field of the Invention

The invention relates to a control apparatus and a control method for a negative pressure generating apparatus. More specifically, the invention relates to a control apparatus and a control method for a negative pressure generating apparatus, which prevent or suppress occurrence of clogging due to freezing in the negative pressure generating apparatus.

2. Description of the Related Art

In a vehicle, an ejector is used to supply a negative pressure whose magnitude is larger than that of a negative pressure to be taken from an intake passage (for example, an intake manifold or a surge tank) in an intake system for an internal combustion engine, to a negative pressure operating device such as a brake booster (hereinafter, the negative pressure to be taken from the intake passage may be referred to as "intake pipe negative pressure"). The ejector is described, for example, in Japanese Patent Application Publication No. 2005-69175 (JP-A-2005-69175), Japanese Patent Application Publication No. 2005-297654 (JP-A-2005-297654), and Japanese Patent Application Publication No. 2006-131003 (JP-A-2006-131003).

For example, the publication No. 2005-69175 describes a technology in which the ejector is prohibited from being operated until a predetermined time elapses after the engine is started. Because the temperature of a coolant for the engine is increased when the predetermined time elapses after the engine is started, it is possible to prevent or suppress occurrence of clogging due to freezing in the negative pressure generating apparatus to some extent, according to the technology described in the publication No. 2005-69175. However, because intake air flowing in the ejector is air taken from outside, for example, when the engine is brought from a cold state (in which, for example, the temperature of the coolant is lower than 75° C.) to a warm state after the engine is started (in other words, when warming-up is completed), the temperature of air flowing in the ejector is hardly changed. Accordingly, in the technology described in the publication No. 2005-69175, for example, when an outside air temperature is equal to or lower than 0° C., it is not possible to sufficiently prevent or suppress occurrence of clogging due to freezing.

Further, because the ejector generates the negative pressure whose magnitude is larger than that of the intake pipe negative pressure using the venturi effect, an inner passage where the negative pressure is generated is narrowed in the ejector. Therefore, when the intake air flows in the inner passage, the temperature of the intake air is decreased. Thus, when the temperature of the intake air is low, and is decreased as described above, clogging may occur due to freezing of moisture and the like contained in the intake air even after warming-up is completed, partly because the temperature in an engine room is still low. That is, clogging due to freezing may occur in the entire negative pressure generating apparatus when the outside air temperature is equal to or lower than 0° C. In addition, even if the outside air temperature is higher than 0° C., clogging due to freezing may occur in the ejector and the negative pressure generating apparatus including the ejector when the temperature of the intake air is decreased as described above. If clogging due to freezing occurs, it may not be possible to use the ejector for a long period until the clogging due to freezing is eliminated.

SUMMARY OF THE INVENTION

The invention provides a control apparatus and a control method for a negative pressure generating apparatus, which prevent or suppress occurrence of clogging due to freezing in the negative pressure generating apparatus.

A first aspect of the invention relates to a control apparatus for a negative pressure generating apparatus that includes an ejector that generates a negative pressure whose magnitude is larger than that of a negative pressure to be taken from an intake passage in an intake system for an internal combustion engine provided in a vehicle; and state change means for making the ejector function or stop functioning. The control apparatus includes prohibition control means for prohibiting the state change means from making the ejector function, according to a temperature of intake air. In the above-described configuration, for example, when the temperature of the intake air is equal to or lower than a predetermined temperature, the intake air does not flow in the ejector. Therefore, it is possible to prevent or suppress occurrence of freezing in the negative pressure generating apparatus. It is preferable that the temperature of the intake air should be the temperature of the intake air detected in the intake system at a position upstream of the ejector. However, for example, the temperature of the intake air may be the temperature of outside air around the vehicle before taken into the intake system. That is, the temperature of the intake air may be the temperature of outside air.

In the above-described configuration, when the temperature of the intake air is equal to or lower than the predetermined temperature, and the negative pressure to be taken from the intake passage is a negative value equal to or smaller than a predetermined value, the prohibition control means may prohibit the state change means from making the ejector function. When the temperature of the intake air is low, clogging due to freezing does not necessarily occur. Therefore if the ejector does not function when the magnitude of the intake pipe negative pressure is greatly decreased, the negative pressure whose magnitude is sufficiently large is not supplied to a negative pressure operating device such as a brake booster. Therefore, the negative pressure operating device does not perform a predetermined function. Thus, in the above-described configuration, when the magnitude of the intake pipe negative pressure is decreased, priority is given to the supply of the negative pressure to the negative pressure operating device using the ejector. Therefore, it is also possible to ensure the functioning of the negative pressure operating device.

In the above-described configuration, when the internal combustion engine is in a cold state, the prohibition control means may prohibit the state change means from making the ejector function. More specifically, for example, in the case where the state change means makes the ejector function at least when the internal combustion engine is in a cold state, the state change means is prohibited from making the ejector function, for the following reasons. There is a case where the state change means makes the ejector function when the internal combustion engine is in a cold state, while the state change means makes the ejector stop functioning when the internal combustion engine is in a warm state. In addition, clogging due to freezing is unlikely to occur when a temperature in an engine room is further increased after warning-up is completed. Therefore, it is necessary to prevent or suppress occurrence of clogging due to freezing in the negative pressure generating apparatus, particularly when the internal combustion engine is in a cold state.

A second aspect of the invention relates to a control method for a negative pressure generating apparatus that includes an ejector that generates a negative pressure whose magnitude is larger than that of a negative pressure to be taken from an intake passage in an intake system for an internal combustion engine provided in a vehicle; and state change means for making the ejector function or stop functioning. The control method includes prohibiting the state change means from making the ejector function, according to a temperature of intake air.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

Hereinafter, a first embodiment and a second embodiment of the invention will be described in detail with reference to the drawings.

Figure 1:
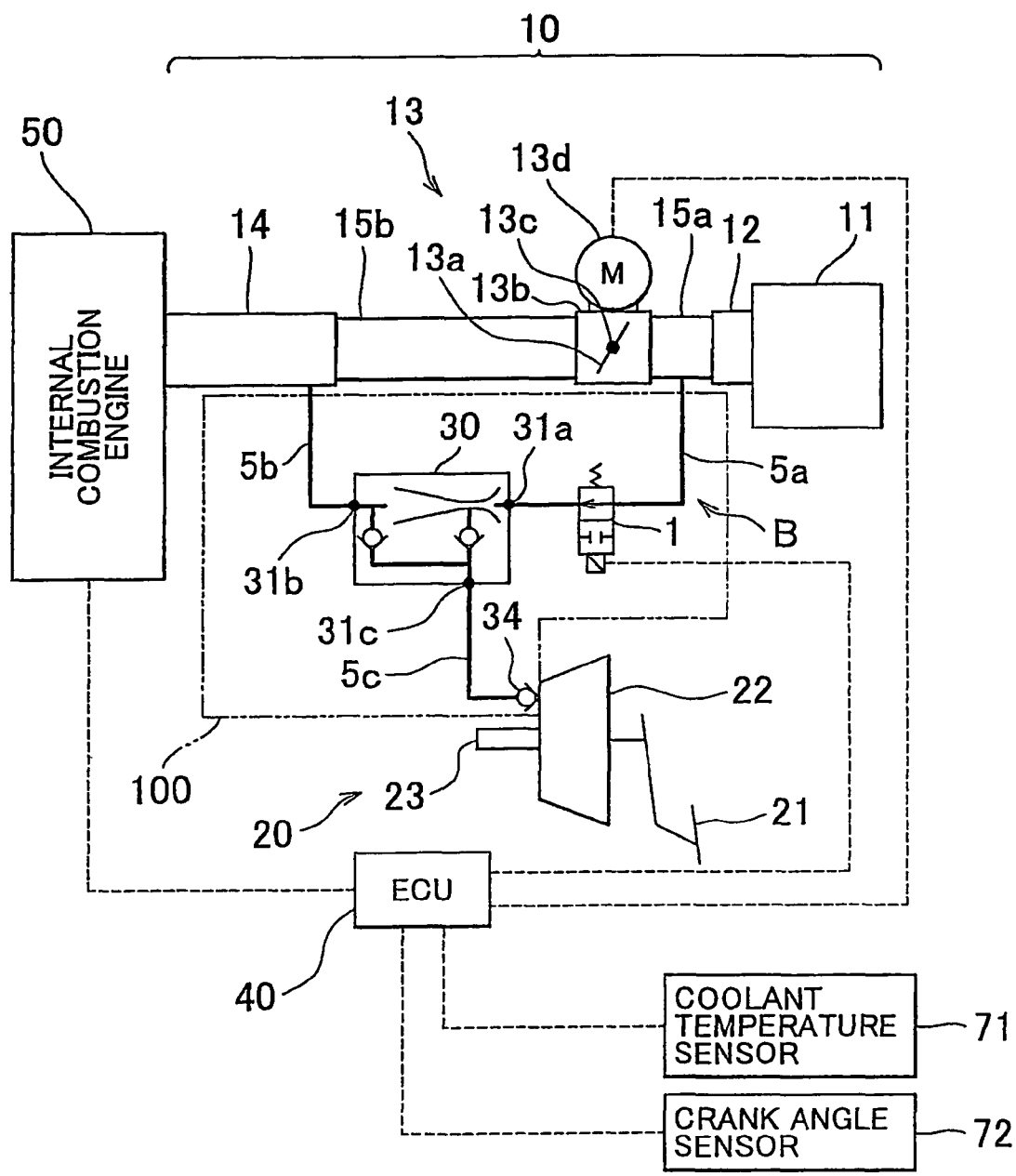
FIG. 1 is a schematic diagram showing a control apparatus for a negative pressure generating apparatus according to each of a first embodiment and a second embodiment of the invention, along with the negative pressure generating apparatus.

FIG. 1 is a schematic diagram showing a control apparatus for a negative pressure generating apparatus according to each of the first embodiment and the second embodiment of the invention, along with a negative pressure generating apparatus 100. The control apparatus is implemented by an ECU (Electronic Control Unit) 40. Components shown in FIG. 1, which include an internal combustion engine 50, are provided in a vehicle (not shown). An intake system 10 for the internal combustion engine 50 includes an air cleaner 11, an airflow meter 12, an electric throttle 13, an intake manifold 14, intake ports (not shown) connected to cylinders (not shown) of the internal combustion engine 50, and members (for example, intake pipes 15a and 15b) that are appropriately provided among the components. The air cleaner 11 filters intake air supplied to the cylinders of the internal combustion engine 50. The atmospheric air flows into the air cleaner 11 through an air duct (not shown). The airflow meter 12 measures the amount of intake air, and outputs a signal corresponding to the amount of intake air. In the airflow meter 12, an intake air temperature sensor (not shown) is provided. The ECU 40 detects the temperature of intake air (hereinafter, simply referred to as "intake air temperature") based on an output from the intake air temperature sensor.

The electric throttle 13 includes a throttle valve 13a, a throttle body 13b, a valve shaft 13c, and an electric motor 13d. The amount of intake air supplied to the internal combustion engine 50 is adjusted by changing the opening degree of the throttle valve 13a. The throttle body 13b is a cylindrical member in which an intake passage is formed. The throttle body 13b supports the valve shaft 13c for the throttle valve 13a provided in the intake passage. The electric motor 13d changes the opening degree of the throttle valve 13a according to a control executed by the ECU 40. As the electric motor 13d, a step motor is employed. The electric motor 13d is fixed to the throttle body 13b. An output shaft (not shown) of the electric motor 13d is connected to the valve shaft 13c. The ECU 40 detects the opening degree of the throttle valve 13a, based on a signal output from a throttle-valve opening degree sensor (not shown) provided in the electric throttle 13.

As the throttle mechanism, the electric throttle 13 is employed. The electric throttle 13 is a throttle-by-wire throttle mechanism, and the throttle valve 13a is driven by the actuator. Instead of the electric throttle 13, a mechanical throttle mechanism may be employed. In the mechanical throttle mechanism, for example, the opening degree of the throttle valve 13a is changed according to operation of an accelerator pedal (not shown) using a wire or the like. In the intake manifold 14, one intake passage on an upstream side is divided into a plurality of branch intake passages on a downstream side. The branch intake passages on the downstream side correspond to the respective cylinders of the internal combustion engine 50. Thus, the intake manifold 14 distributes intake air into the cylinders of the internal combustion engine 50.

A brake device 20 includes a brake pedal 21, a brake booster (negative pressure operating device) 22, a master cylinder 23, and wheel cylinders (not shown). A driver operates the brake pedal 21 to apply a brake to the rotation of wheels. The brake pedal 21 is connected to an input rod (not shown) of the brake booster 22. The brake booster 22 generates an assist force so that the ratio of the assist force to a pedal depression force is equal to a predetermined ratio. In the brake booster 22, a negative pressure chamber (not shown) close to the master cylinder 23 is connected to the intake passage in the intake manifold 14 through an ejector 30. An output rod (not shown) of the brake booster 22 is connected to an input shaft (not shown) of the master cylinder 23. The master cylinder 23 generates a hydraulic pressure according to an acting force from the brake booster 22 that obtains the assist force in addition to the pedal depression force. The master cylinder 23 is connected to the wheel cylinder provided in a disc brake mechanism (not shown) for each wheel via a hydraulic circuit. The wheel cylinder generates a braking force using the hydraulic pressure supplied to the wheel cylinder from the master cylinder 23. The brake booster 22 is not limited to a specific brake booster, and may be an ordinary brake booster, as long as the brake booster 22 is a pneumatic brake booster.

The ejector 30 generates a negative pressure whose magnitude is larger than that of a negative pressure (i.e., an intake pipe negative pressure) to be taken from the intake system 10, more specifically, the intake manifold 14 downstream of the throttle valve 13a, and supplies the generated negative pressure to the negative pressure chamber of the brake booster 22. The ejector 30 includes an inflow port 31a, an outflow port 31b, and a negative pressure supply port 31c. The negative pressure supply port 31c among the ports is connected to the negative pressure chamber of the brake booster 22 by an air hose 5c. The inflow port 31a is connected to the intake passage in the intake pipe 15a by an air hose 5a at a position upstream of the electric throttle 13, more specifically, the throttle valve 13a. The outflow port 31b is connected to the intake passage in the intake manifold 14 by an air hose 5b at a position downstream of the electric throttle 13, more specifically, the throttle valve 13a. Thus, a bypass passage B that bypasses the electric throttle 13 is formed by the ejector 30 and the air hoses 5a and 5b. When the ejector 30 does not function, the negative pressure is supplied to the negative pressure chamber of the brake booster 22 from the intake passage in the intake manifold 14 through the air hose 5b, the outflow port 31b and the negative pressure supply port 31c of the ejector 30, and the air hose 5c.

The air hose 5a is provided with a VSV (Vacuum Switching Valve) 1. The VSV1 opens/closes the bypass passage B according to a control executed by the ECU 40. In the embodiment, as the VSV1, a normally-closed solenoid valve with two positions and two ports is employed. However, the VSV1 is not limited to this valve. For example, other appropriate electromagnetic valves may be employed as the VSV1. Further, for example, the VSV1 may be a flow rate regulating valve that controls the flow rate of the intake air flowing in a flow passage. The VSV1 makes the ejector 30 function or stop functioning by opening or closing the bypass passage B. In the embodiment, the state change means is implemented by the VSV1.

Figure 2:
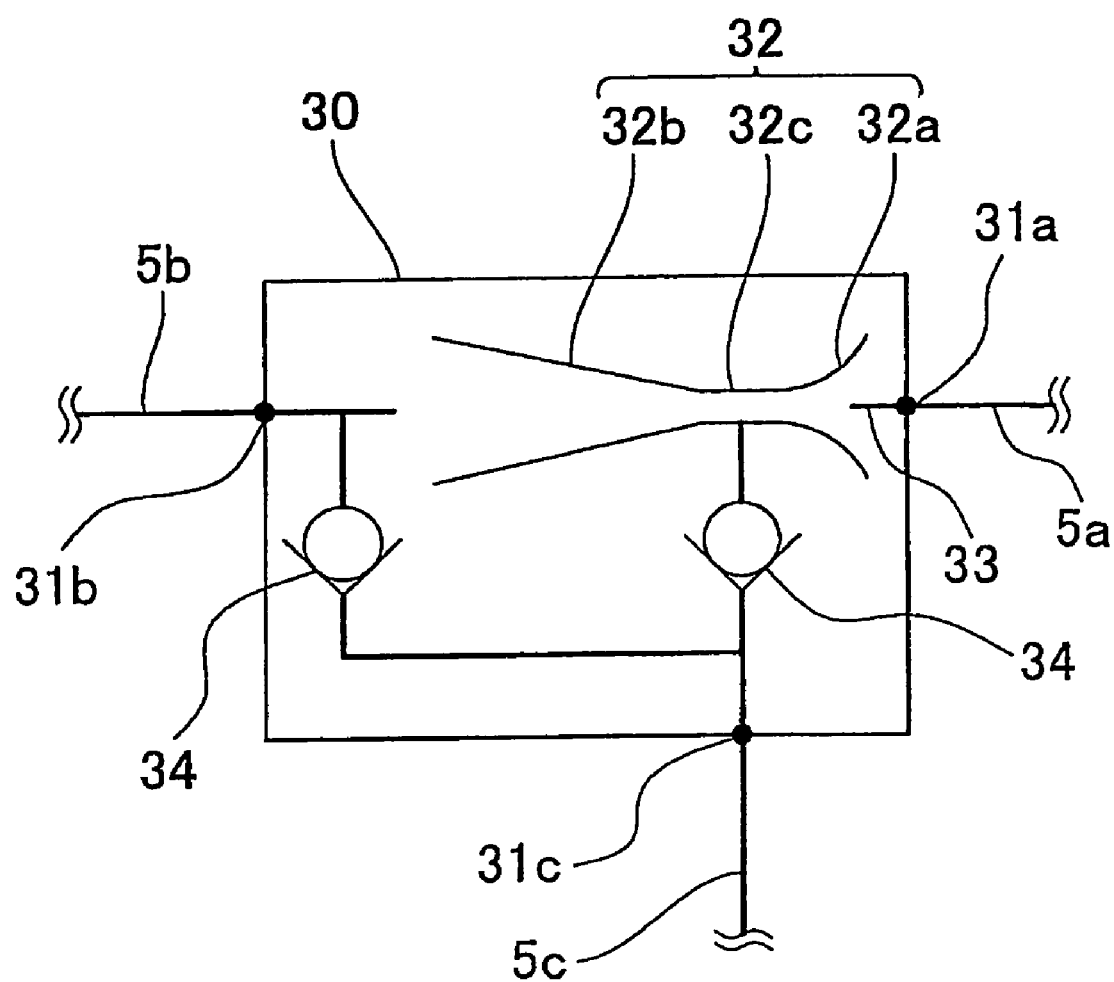
FIG. 2 is a schematic diagram showing the configuration of an inside of an ejector shown in FIG. 1.

FIG. 2 is a schematic diagram showing the configuration of an inside of the ejector shown in FIG. 1. A diffuser 32 is provided inside the ejector 30. The diffuser 32 includes a taper portion 32a, a taper portion 32b, and a negative pressure obtaining portion 32c that serves as a passage connecting the taper portions 32a and 32b. The diameter of the taper portion 32a decreases toward the outflow port 31b, and the diameter of the taper portion 32b increases toward the outflow port 31b. The taper portion 32a is open toward the inflow port 31a. The taper portion 32b is open toward the outflow port 31b. The negative pressure obtaining portion 32c is connected to the negative pressure supply port 31c. The inflow port 31a is provided with a nozzle 33 that injects the intake air, which has flown to the ejector 30, toward the taper portion 32a. The intake air injected from the nozzle 33 flows through the diffuser 32, and flows out from the outflow port 31b to the air hose 5b. At this time, a high-speed jet is generated in the diffuser 32, and accordingly, a great negative pressure is generated in the negative pressure obtaining portion 32c using the venturi effect. Further, the negative pressure is supplied from the negative pressure supply port 31c to the negative pressure chamber through the air hose 5c. Using this function of the ejector 30, it is possible to obtain the negative pressure whose magnitude is larger than that of the negative pressure to be taken from the intake manifold 14.

Check valves 34 are provided in an inner passage between the negative pressure obtaining portion 32c and the negative pressure supply port 31c, in an inner passage between the outflow port 31b and the negative pressure supply port 31c, and in a connection portion of the brake booster 22, to which the air hose 5c is connected. Each of the check valves 32 prevents a backflow. The ejector 30 need not necessarily have the inner structure shown in FIG. 2. Other ejectors that have inner structures different from the inner structure shown in FIG. 2 may be employed, instead of the ejector 30. In the embodiment, a negative pressure generating apparatus 100 includes the VSV1 and the ejector 30. More specifically, the negative pressure generating apparatus 100 includes the air hoses 5a, 5b, and 5c, and the check valves 34.

The ECU 40 includes a microcomputer (not shown) and input/output circuits (not shown). The microcomputer includes a CPU (Central Processing Unit), a ROM (Read Only Memory), and a RAM (Random Access Memory). The ECU 40 mainly controls the internal combustion engine 50. In the embodiment, the ECU 40 also controls the VSV1 and the electric throttle 13. The ECU 40 is connected to the VSV1, the electric throttle 13, and other devices to be controlled by the ECU 40. The ECU 40 is also connected to sensors, such as the throttle-valve opening degree sensor, a coolant temperature sensor 71 that detects the temperature of a coolant for the internal combustion engine 50, a crank angle sensor 72 that detects a rotational speed NE of the internal combustion engine 50.

The ROM stores programs in which processes to be executed by the CPU are described. In the embodiment, the ROM stores, for example, an engine control program used to control the internal combustion engine 50, and a VSV1 control program used to control the VSV1 to make the ejector 30 function or stop functioning (i.e., to open or close the VSV1) under various conditions. The programs may be integrated with each other.

The VSV1 control program includes a negative pressure supply program used to open the VSV1 so that the negative pressure is supplied to the brake booster 22 using the ejector 30 when the coolant temperature is higher than a predetermined temperature T1 and lower than a predetermined temperature T2. The predetermined temperature T1 is set so that the VSV1 is closed when there is a possibility that an idling engine speed will become unstable as a result of making the ejector 30 function immediately after the internal combustion engine 50 is started. The predetermined temperature T2 is set so that the VSV1 is closed when the internal combustion engine 50 is in a warm state. Thus, after the coolant temperature reaches the predetermined temperature T1, basically, the VSV1 is opened when the internal combustion engine 50 is in a cold state, and the VSV1 is closed when the internal combustion engine 50 is in a warm state, according to the negative pressure supply program. Further, the negative pressure supply program is configured to open the VSV1 when the opening degree of the throttle valve 13a is smaller than a predetermined opening degree $\alpha$. The predetermined opening degree $\alpha$ is appropriately set so that it can be determined that the internal combustion engine 50 is idling when the opening degree of the throttle valve 13a is smaller than the predetermined opening degree $\alpha$. Thus, basically, the VSV1 is opened when the coolant temperature is higher than the predetermined temperature T1 and lower than the predetermined temperature T2, and the internal combustion engine 50 is idling, according to the negative pressure supply program.

The VSV1 control program includes a prohibition control program used to prohibit the VSV1 from being opened when the intake air temperature is equal to or lower than a predetermined value $\beta$, according to the intake air temperature. Therefore, the VSV1 control program further includes an intake air temperature determination program used to determine whether the intake air temperature is higher than the predetermined value $\beta$. More specifically, in the embodiment, the prohibition control program is configured to prohibit the VSV1 from being opened according to the negative pressure supply program, when the intake air temperature is equal to or lower than the predetermined value $\beta$. However, the prohibition control program need not necessarily be configured in this manner. The prohibition control program may be configured to prohibit the VSV1 from being opened based on other conditions when the intake air temperature is equal to or lower than the predetermined value $\beta$. In the embodiment, the control means, the detection means, the determination means, and the like are implemented by the microcomputer, and the above-described programs. Particularly, the prohibition control means is implemented by the microcomputer and the prohibition control program.

Next, a routine executed by the ECU 40 will be described in detail with reference to a flowchart shown in FIG. 3. The CPU repeatedly executes the routine shown by the flowchart, according to the above-described programs stored in the ROM, at extremely short time intervals, and thus, the ECU 40 prohibits the VSV1 from being opened when the intake air temperature is equal to or lower than the predetermined value β. The CPU determines whether the coolant temperature is higher than the predetermined temperature T1 and lower than the predetermined temperature T2 (step S11). When a negative determination is made in step S11, the CPU closes the VSV1 (step S15). When an affirmative determination is made in step S12, the CPU determines whether the opening degree of the throttle valve 13*a* is smaller than the predetermined opening degree α (step S12). When a negative determination is made in step S12, the CPU proceeds to step S15.

When an affirmative determination is made in step S12, the CPU determines whether the intake air temperature is higher than the predetermined value β (step S13). In the embodiment, the predetermined value β is set to 0° C. The predetermined value β may be appropriately set so that when the intake air temperature is equal to or lower than the predetermined value β, the intake air temperature is decreased to a value equal to or lower than 0° C. due to the venturi effect in the ejector 30. When an affirmative determination is made in step S13, the CPU determines that clogging due to freezing will not occur, and opens the VSV1 (step S14). Thus, the negative pressure is supplied to the brake booster 22 using the ejector 30. When a negative determination is made in step S13, the CPU closes the VSV1 (step S15). Thus, it is possible to prevent or suppress occurrence of clogging due to freezing in the negative pressure generating apparatus 100.

Figure 3:
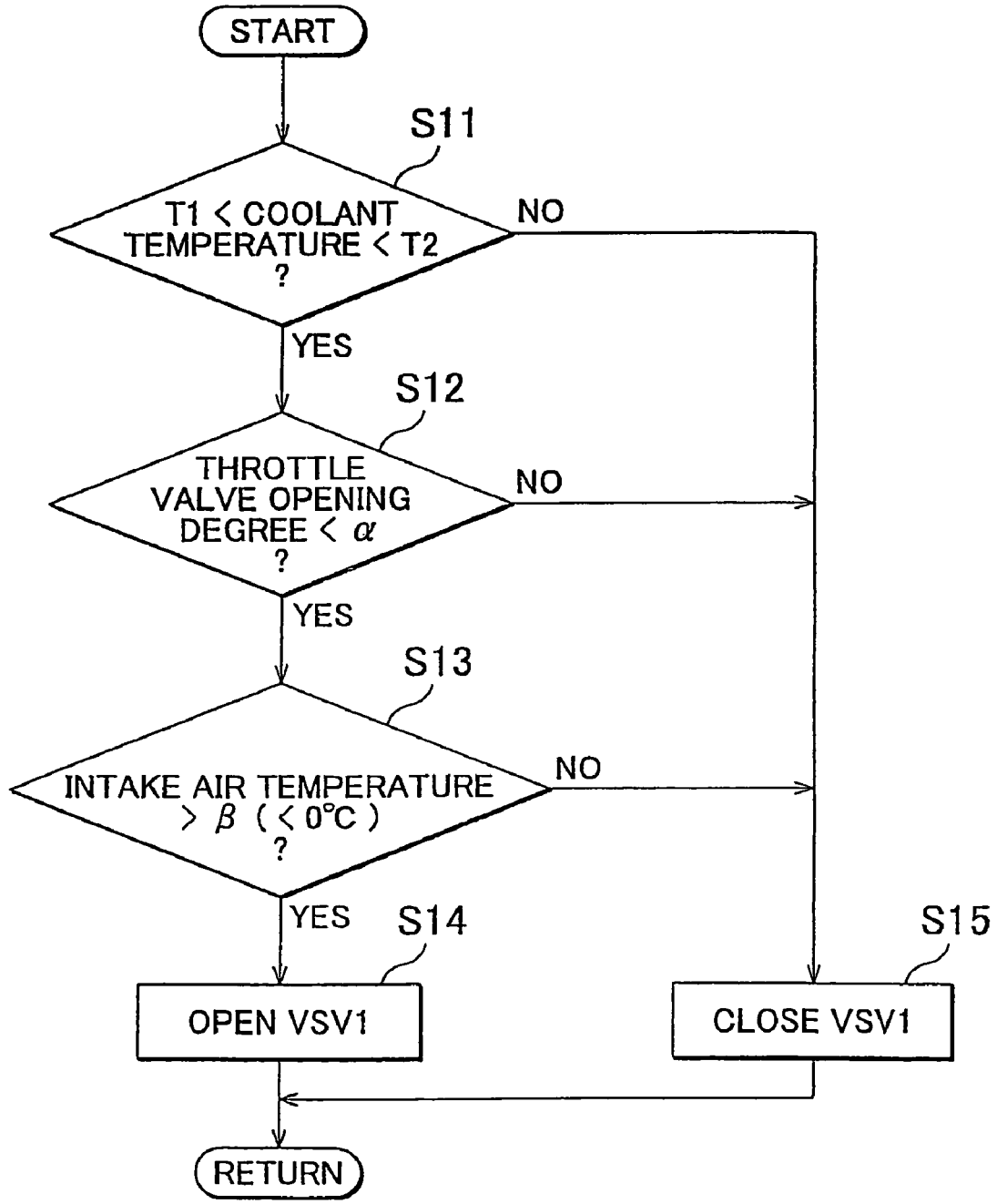
FIG. 3 is a diagram showing a flowchart of a routine executed by the control apparatus for the negative pressure generating apparatus according to the first embodiment of the invention.

An outside air temperature sensor that detects an outside air temperature may be further provided, and it may be determined whether the outside air temperature detected by the outside air temperature sensor is equal to or lower than the predetermined value β, instead of executing step S13, in the flowchart shown in FIG. 3. This process may be implemented by configuring the intake air temperature determination program so that it is determined whether the outside air temperature is higher than the predetermined value β, instead of determining whether the intake air temperature is higher than the predetermined value β, and configuring the prohibition control program so that the VSV1 is prohibited from being opened when the outside air temperature is equal to or lower than the predetermined value β, instead of prohibiting the VSV1 from being opened when the intake air temperature is equal to or lower than the predetermined value β. Thus, it is possible to implement the ECU 40 that prevents or suppresses occurrence of clogging due to freezing in the negative pressure generating apparatus 100.

An ECU 40 according to a second embodiment of the invention is the same as the ECU 40 according to the first embodiment of the invention, except that the prohibition control program stored in the ROM is configured in the manner described below. The components of the vehicle to which the ECU 40 according to the second embodiment is applied are the same as those shown in FIG. 1, except that the ECU 40 according to the second embodiment differs from the ECU 40 according to the first embodiment. In the second embodiment, the prohibition control program is configured to prohibit the VSV1 from being opened when the intake pipe negative pressure is a negative value equal to or smaller than a predetermined value P. Therefore, the VSV1 control program in the second embodiment includes an intake pipe negative pressure determination program used to determine whether the intake pipe negative pressure is a negative value larger than the predetermined value P. When the intake pipe negative pressure is a negative value larger than the predetermined value P, the prohibition control program does not prohibit the VSV1 from being opened, and therefore, the VSV1 is opened according to the negative pressure supply program. In the embodiment, the prohibition control means is implemented by the microcomputer and the prohibition control program. The control apparatus for the negative pressure generating apparatus according to the second embodiment is implemented by the ECU 40.

Figure 4:
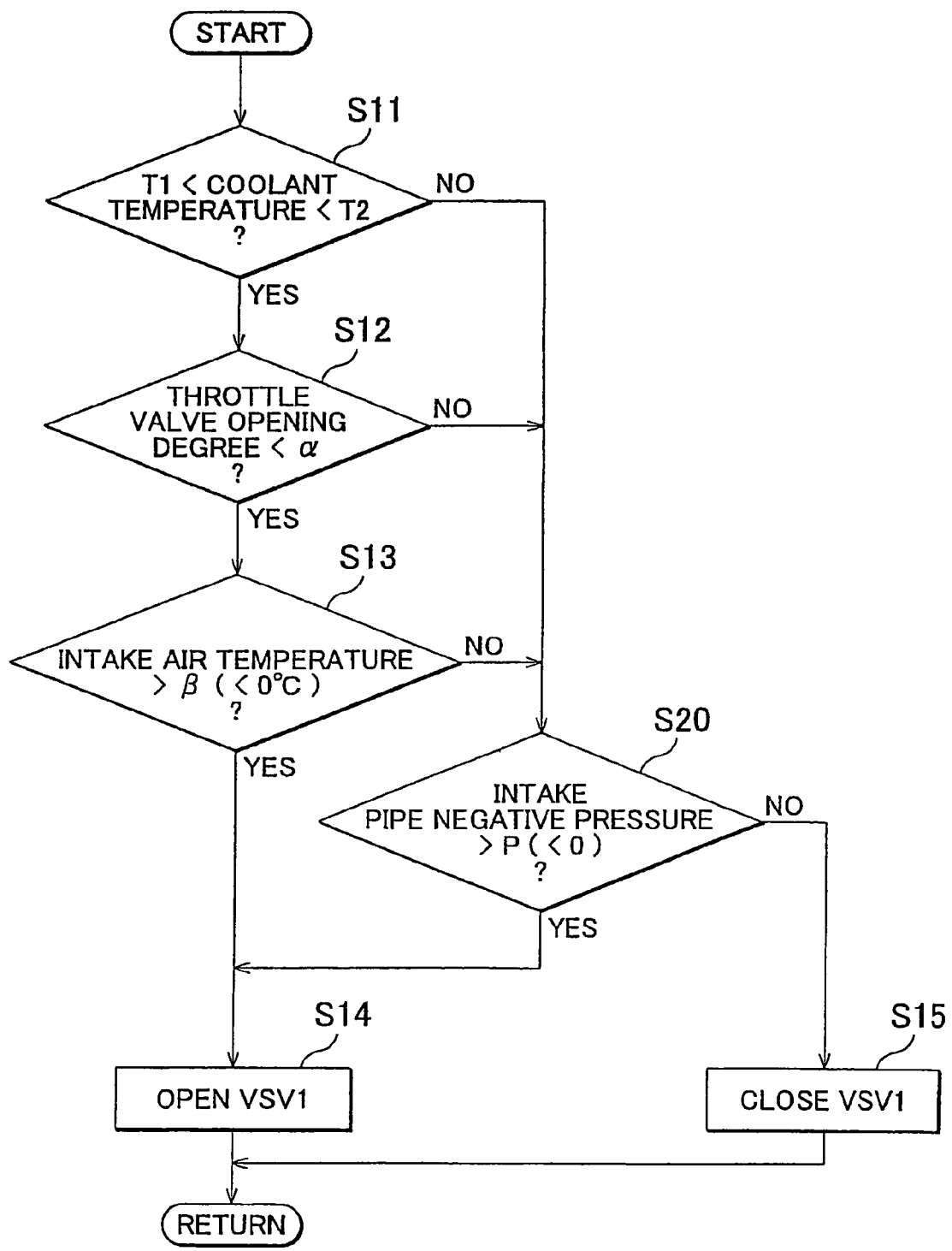
FIG. 4 is a diagram showing a flowchart of a routine executed by the control apparatus for the negative pressure generating apparatus according to the second embodiment of the invention.

Next, the routine executed by the ECU 40 will be described in detail with reference to a flowchart shown in FIG. 4. The flowchart shown in FIG. 4 is the same as the flowchart shown in FIG. 3 in the first embodiment, except that step S20 is executed after a negative determination is made in step S13. Therefore, in the second embodiment, particularly step S20 will be described in detail. When a negative determination is made in step S13, the CPU determines whether the intake pipe negative pressure is a negative value larger than the predetermined value P (step S20). The predetermined value P is set to ensure the functioning of the brake booster 22 when the magnitude of the intake pipe negative pressure is decreased. The magnitude of the intake pipe negative pressure may be greatly decreased, for example, when the internal combustion engine 50 is in a cold state, particularly, when the electric throttle 13 or a VVT (variable Valve Timing) mechanism (in the case where the internal combustion engine 50 includes the VVT mechanism) malfunctions due to cold temperature. Therefore, in the second embodiment, the predetermined value P is set so that when the magnitude of the intake pipe negative pressure is decreased, an affirmative determination is made in step S20.

Accordingly, when a negative determination is made in step S20, it is not necessary to supply the negative pressure to the brake booster 22 using the ejector 30 taking into account occurrence of clogging due to freezing. Therefore, the CPU proceeds to step S15. Thus, it is possible to prevent or suppress occurrence of clogging due to freezing in the negative pressure generating apparatus 100. When an affirmative determination is made in step S20, the CPU proceeds to step S14 to supply the negative pressure to the brake booster 22 using the ejector 30. Thus, priority is given to the supply of the negative pressure to the brake booster 22 using the ejector 30. Therefore, it is also possible to ensure the functioning of the brake booster 22. As described above, it is possible to implement the ECU 40 that prevents or suppresses occurrence of clogging due to freezing in the negative pressure generating apparatus 100, and ensures the functioning of the brake booster 22.

The above-described embodiments are example embodiments of the invention. However, the invention is not limited to the embodiments. Various modifications may be made to the embodiments within the scope of the invention.

The invention claimed is:

1. A control apparatus for a negative pressure generating apparatus, comprising:
   an ejector that generates a negative pressure whose magnitude is larger than that of a negative pressure to be taken from an intake passage in an intake system for an internal combustion engine provided in a vehicle;
   a state change device that makes the ejector function or stop functioning; and
   a prohibition control device that prohibits the state change device from making the ejector function, according to a temperature of intake air.

2. The control apparatus according to claim 1, wherein when the temperature of the intake air is equal to or lower than a predetermined temperature, the prohibition control device prohibits the state change device from making the ejector function.

3. The control apparatus according to claim 2, wherein the predetermined temperature is set so that when the temperature of the intake air is equal to or lower than the predetermined temperature, the temperature of the intake air is decreased to a value equal to or lower than 0° C. due to a venturi effect in the ejector.

4. The control apparatus according to claim 1, wherein when the temperature of the intake air is equal to or lower than a predetermined temperature, and the negative pressure to be taken from the intake passage is a negative value equal to or smaller than a predetermined value, the prohibition control device prohibits the state change device from making the ejector function.

5. The control apparatus according to claim 1, wherein when the internal combustion engine is in a cold state, the prohibition control device prohibits the state change device from making the ejector function.

6. The control apparatus according to claim 1, wherein when an opening degree of a throttle valve provided in the vehicle is smaller than a predetermined opening degree and the temperature of the intake air is equal to or lower than a predetermined temperature, the prohibition control device prohibits the state change device from making the ejector function.

7. The control apparatus according to claim 1, wherein when a temperature of a coolant for the internal combustion engine is within a predetermined temperature range and the temperature of the intake air is equal to or lower than a predetermined temperature, the prohibition control device prohibits the state change device from making the ejector function.

8. The control apparatus according to claim 1, further comprising
an outside air temperature sensor that is provided in the vehicle, and that detects an outside air temperature as the temperature of the intake air, wherein when the detected outside air temperature is equal to or lower than a predetermined temperature, the prohibition control device prohibits the state change device from making the ejector function.

9. A control method for a negative pressure generating apparatus that includes an ejector that generates a negative pressure whose magnitude is larger than that of a negative pressure to be taken from an intake passage in an intake system for an internal combustion engine provided in a vehicle; and state change device that makes the ejector function or stop functioning, comprising
prohibiting the state change device from making the ejector function, according to a temperature of intake air.

* * * * *